(12) United States Patent
Shouno

(10) Patent No.: US 8,706,848 B2
(45) Date of Patent: Apr. 22, 2014

(54) CONTROL APPARATUS, COMMUNICATION CONTROL METHOD EXECUTED BY THE CONTROL APPARATUS, COMMUNICATION CONTROL PROGRAM CONTROLLING THE CONTROL APPARATUS, AND DATA PROCESSING SYSTEM

(75) Inventor: Hiroki Shouno, Kawasaki (JP)

(73) Assignee: Canon Kabushik Kaisha, Tokyo (JP)

( * ) Notice: Subject to any disclaimer, the term of this patent is extended or adjusted under 35 U.S.C. 154(b) by 1486 days.

(21) Appl. No.: 11/372,633

(22) Filed: Mar. 10, 2006

(65) Prior Publication Data

US 2006/0212554 A1 Sep. 21, 2006

(30) Foreign Application Priority Data

Mar. 18, 2005 (JP) ................................. 2005-080593

(51) Int. Cl.
*G06F 15/177* (2006.01)

(52) U.S. Cl.
USPC ............ 709/221; 709/220; 709/230; 709/238

(58) Field of Classification Search
USPC .................................. 709/220, 221, 230, 238
See application file for complete search history.

(56) References Cited

U.S. PATENT DOCUMENTS

| | | | | |
|---|---|---|---|---|
| 6,286,039 | B1 * | 9/2001 | Van Horne et al. ............ | 709/221 |
| 6,446,134 | B1 * | 9/2002 | Nakamura ..................... | 719/313 |
| 7,024,471 | B2 * | 4/2006 | George et al. ................. | 709/222 |
| 7,103,650 | B1 * | 9/2006 | Vetrivelkumaran et al. .. | 709/221 |
| 7,352,707 | B2 * | 4/2008 | Ho et al. ........................ | 370/256 |
| 7,355,983 | B2 * | 4/2008 | Scudder et al. ............... | 370/242 |
| 2002/0018447 | A1 * | 2/2002 | Yamada et al. ............... | 370/252 |
| 2002/0052936 | A1 * | 5/2002 | Gai et al. ....................... | 709/220 |
| 2002/0172207 | A1 * | 11/2002 | Saito et al. ..................... | 370/400 |
| 2002/0186664 | A1 * | 12/2002 | Gibson et al. ................. | 370/254 |
| 2003/0009584 | A1 * | 1/2003 | Basso et al. ................... | 709/238 |
| 2003/0123457 | A1 * | 7/2003 | Koppol ........................ | 370/400 |
| 2003/0177344 | A1 * | 9/2003 | Harvey, IV ....................... | 713/1 |
| 2003/0187964 | A1 * | 10/2003 | Sage et al. ..................... | 709/221 |
| 2003/0206528 | A1 * | 11/2003 | Lingafelt et al. .............. | 370/238 |
| 2003/0218988 | A1 * | 11/2003 | Han et al. ...................... | 370/254 |
| 2003/0229686 | A1 * | 12/2003 | Kortright ...................... | 709/220 |
| 2004/0177136 | A1 * | 9/2004 | Chen et al. .................... | 709/223 |
| 2005/0071502 | A1 * | 3/2005 | Kamat et al. .................. | 709/239 |
| 2005/0177634 | A1 * | 8/2005 | Scudder et al. ............... | 709/225 |
| 2006/0031447 | A1 * | 2/2006 | Holt et al. ..................... | 709/223 |
| 2006/0056411 | A1 * | 3/2006 | Badat et al. ................... | 370/392 |
| 2006/0098648 | A1 * | 5/2006 | Fukunaga et al. ............ | 370/389 |

FOREIGN PATENT DOCUMENTS

JP 2005-026971 A 1/2005

* cited by examiner

*Primary Examiner* — Abdullahi Salad
*Assistant Examiner* — Jimmy H Tran
(74) *Attorney, Agent, or Firm* — Canon USA, Inc., IP Division

(57) ABSTRACT

A control apparatus is provided between a first network and a second network different from the first network, in which a data processing apparatus is connected to the first network. The control apparatus notifies the data processing apparatus of a change of setting information that is set for network communications. Then, the control apparatus rewrites information involved in received data according to the changed setting information, when the data processing apparatus transmits data to be transmitted to a destination apparatus connected to the second network under a condition that the data processing apparatus is not yet operating based on the changed setting information.

13 Claims, 11 Drawing Sheets

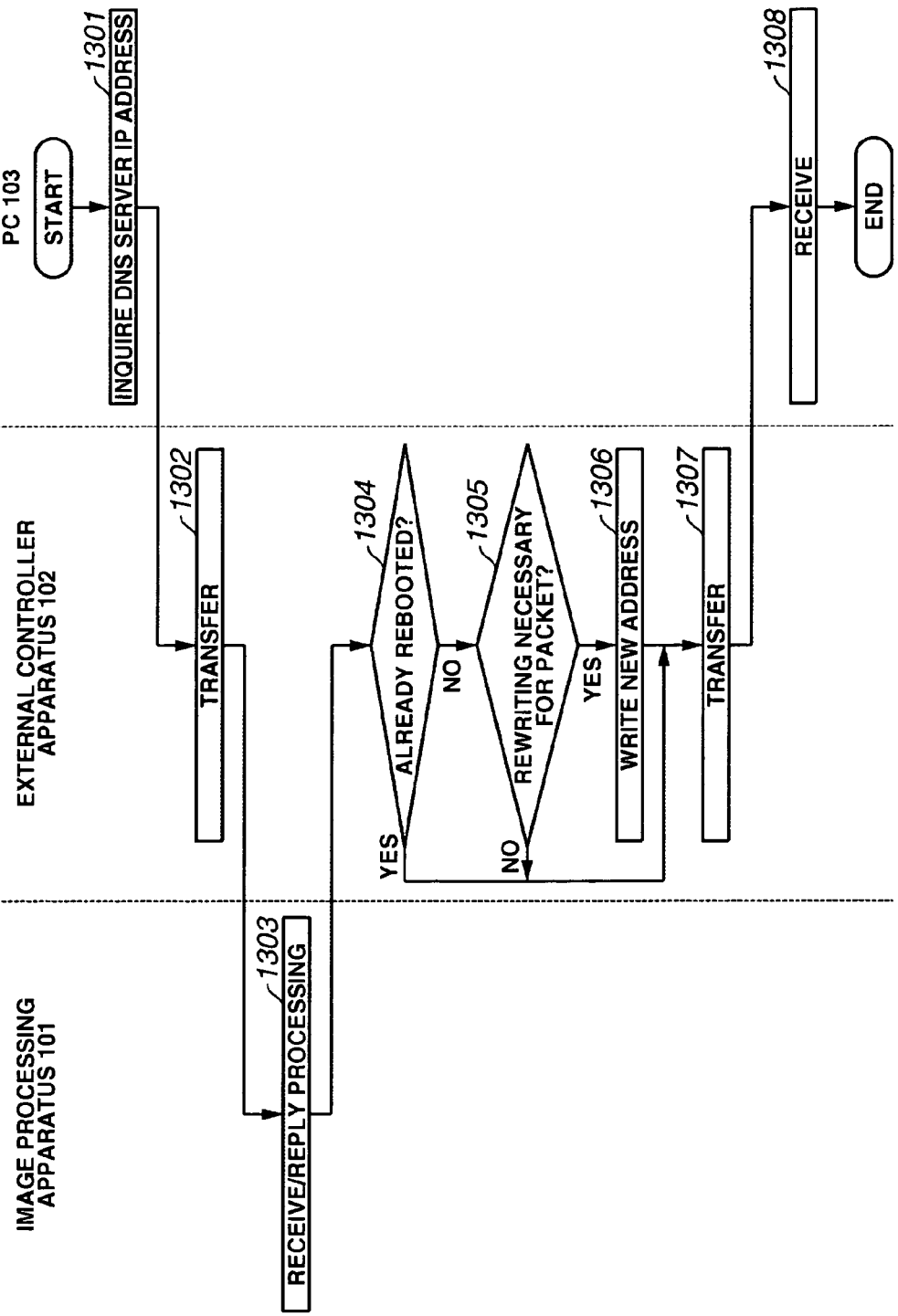

CONTROL APPARATUS, COMMUNICATION CONTROL METHOD EXECUTED BY THE CONTROL APPARATUS, COMMUNICATION CONTROL PROGRAM CONTROLLING THE CONTROL APPARATUS, AND DATA PROCESSING SYSTEM

BACKGROUND OF THE INVENTION

1. Field of the Invention

The present invention relates to a control apparatus configured to perform communications with a data processing apparatus via a network.

2. Description of the Related Art

In general IP (Internet Protocol) network environments, routers (default gateways) play an important role in establishing connections between different network addresses. The routers can store a routing table to determine a transmission direction for an incoming IP packet and transfer the packet to an appropriate network.

For example, when a node "a" belonging to IP network A performs IP communications with a node "b" belonging to IP network B, no direct communications can be realized because of their different network addresses. Hence, the node "a" must set an address of node "b" as a destination IP address for a packet to be sent out and designate a router address as a destination MAC address. Meanwhile, a router receives the packet and transfers the packet to the network B with reference to the routing table. The packet transferred to the network B is then delivered to the node "b". And, transmission of data is accomplished.

Furthermore, there is a conventional routing apparatus that can perform address conversion for the purpose of solving the exhaustion of addresses or related problems. In the present-day Internet environments, LANs (Local Area Network) are available, as a fundamental IP communication tool, even in small offices and homes. The nodes connected to each LAN have IP addresses that are generally called as private addresses. The private addresses are a group of IP addresses that can be freely used in a limited environment. In this respect, the private addresses are particular values different from those for the global address used on the Internet.

Routers can connect respective LANs to the Internet. Thus, there is a possibility that a private address may leak out of a LAN to the Internet when a node of the LAN is connected to a Web server on the Internet. When a LAN is connected to the Internet, from the viewpoint of security, the router does not usually permit routing incoming from the Internet to the LAN, although an opposite routing from a node of the LAN to the Internet is allowed. Therefore, the IP communications cannot be performed if a private address leaks out to the Internet.

NAT (Network Address Translation) is a technique that can solve such a problem. More specifically, due to the NAT technique, a router can change a source IP address of a packet to a global address of the router when a node of the LAN performs IP communications with a node on the Internet. With this processing, the router can eliminate any leakage of private addresses when packets are sent out of nodes of a LAN to the Internet. Furthermore, a communication destination node on the Internet can return a response packet to the source because the source IP address contained in the received packet is an Internet IP address of the router. When the router receives the response packet, the router transfers the response packet to the node of LAN (i.e. to the source).

Furthermore, as a NAT-based technique, there is NAPT (Network Address Port Translation) or IP masquerade. NAPT is a technique that enables a router to perform mapping of ports in addition to rewriting of a source IP address of a packet to a global address of the router when a node of the LAN performs IP communications with a node on the Internet. In general, ports are allocated to respective nodes of a LAN. By rewriting a source port of a packet sent out of a node, each node can be discriminated by a port number when LAN includes a plurality of nodes.

For example, an image processing system based on the NAT or NAPT technique is disclosed in Japanese Patent Application Laid-open No. 2005-026971. It is now supposed that there is a system including a data processing apparatus connected via a local network to an external controller that is connected to a public network. For example, the data processing apparatus has the capability of forming file data of a scanned image and transferring the file data to various servers on a public network according to FTP (File Transfer Protocol) or Email protocol. Furthermore, the external controller can function as a router executing the NAT processing. The external controller can also expand or enhance the functions of the data processing apparatus. For example, a security function for enciphering communications between the public network and the external controller can be included.

In this system, when the data processing apparatus communicates with a node on the public network, the external controller performs the NAT processing for a packet to be sent from the data processing apparatus and transfers the packet having a converted address to the node. In this respect, the external controller can perform the NAT processing for the data processing system. The data processing apparatus and the external controller can be regarded as one system, when seen from a node on the public network.

Furthermore, in a system using a data processing apparatus and an external controller based on the NAT or NAPT technique, the packet being sent out of the data processing apparatus can be rewritten without relying on the NAT or NAPT technique. For example, when a data processing apparatus notifies a node on the public network of a product name of its own device, the product name may be a product name of the data processing apparatus itself or a product name of a system including the data processing apparatus and an external controller.

In such a case, the external controller can rewrite a product name contained in a payload portion of an IP packet and can transfer the rewritten name to a node on the public network. For example, "C3220" is given as a product name for the data processing apparatus itself, and "C3220-C1" is given as a product name for the system including the data processing apparatus and the external controller.

The data processing apparatus sends a packet containing the name "C3220" in its payload portion. The external controller, when performing the NAT processing, rewrites its payload portion (i.e., substitutes "C3220-C1" for "C3220"). In this manner, not only converting the address or the port but also rewriting the payload portion enable management application software to regard both the data processing apparatus and the external controller as one system.

According to the above-described data processing apparatus and the external controller employing the payload rewriting technique in addition to the NAT or NAPT technique, network settings for their devices are generally done commonly and simultaneously. The external controller and the data processing apparatus can share various information with respect to servers connected to the public network, when they communicate with nodes on the public network. To this end, the external controller can perform settings for the shared information and sends the set values to the data processing apparatus.

However, according to the above-described technique, there is a time lag before setting contents become valid in the data processing apparatus after a user has accomplished the network settings on the external controller. Thus, even after the set values are sent out of the external controller, the data processing apparatus is continuously kept in the same operational conditions. In such a case, to forcibly validate the new settings, the data processing apparatus must reboot the system or its power source must be turned on again (hereinafter, simply referred to as "reboot"). However, a user may not interrupt an operation on the data processing apparatus, and accordingly reboot of the system may be postponed. Thus, the data processing apparatus continues its operation based on old set values.

SUMMARY OF THE INVENTION

The present invention is directed to a data processing system including a data processing apparatus and a control apparatus that can perform network communications based on new settings being set by the control apparatus even if the data processing apparatus is not yet operating based on the new settings.

A first aspect of the present embodiment provides a control apparatus provided between a first network and a second network different from the first network; in which a data processing apparatus is connected to the first network, wherein the control apparatus includes a changing unit, a notifying unit, and a rewriting unit. The changing unit changes setting information that is set for network communications. The notifying unit notifies the data processing apparatus of the setting information changed by the changing unit. And, when the control apparatus receives data to be transmitted to a destination apparatus connected to the second network from the data processing apparatus under a condition that the data processing apparatus is not yet operating based on the setting information notified by the notifying unit, the rewriting unit rewrites information included in the received data according to the setting information changed by the changing unit.

Furthermore, the another aspect of the present embodiment provides a communication control method including a changing step, a notifying step, and a rewriting step that are functionally equivalent to the corresponding units of the above-described control apparatus provided between the first network to which the data processing apparatus is connected and the second network different from the first network.

Moreover, the another aspect of the present embodiment provides a communication control program including program codes for the changing step, the notifying step, and the rewriting step of the above-described communication control method.

A second aspect of the present embodiment provides a control apparatus provided between a first network and a second network different from the first network, in which a data processing apparatus is connected to the first network, wherein the control apparatus includes a changing unit, a notifying unit, a detecting unit, and a rewriting unit. The changing unit changes setting information that is set for network communications. The notifying unit notifies the data processing apparatus of the setting information changed by the changing unit. The detecting unit detects a reboot operation of the data processing apparatus performed after notification by the notifying unit. And, when the control apparatus receives data to be transmitted to a destination apparatus connected to the second network from the data processing apparatus under a condition that the detecting unit detects no reboot operation of the data processing apparatus, the rewriting unit rewrites information included in the received data according to the setting information changed by the changing unit.

Furthermore, the another aspect of the present embodiment provides a communication control method including a changing Step, a notifying Step, a detecting Step, and a rewriting Step that are functionally equivalent to the corresponding units of the above-described control apparatus provided between the first network to which the data processing apparatus is connected and the second network different from the first network.

Moreover, the another aspect of the present invention provides a communication control program including program codes for the changing step, the notifying step, the detecting step, and the rewriting step of the above-described communication control method.

A third aspect of the present embodiment provides a data processing system including a data processing apparatus connected to a first network, and a control apparatus provided between the first network and a second network different from the first network. The control apparatus includes a changing unit configured to change setting information that is set for network communications; a notifying unit configured to notify the data processing apparatus of the setting information changed by the changing unit; a detecting unit configured to detect a reboot operation of the data processing apparatus performed after notification by the notifying unit; and a rewriting unit configured to, when the control apparatus receives data to be transmitted to a destination apparatus connected to the second network from the data processing apparatus under a condition that the detecting unit detects no reboot operation of the data processing apparatus, rewrite information included in the received data according to the setting information changed by the changing unit.

Further embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain the principles of the invention.

FIG. 13 is a flowchart showing a processing procedure of the external controller apparatus that has received an inquiry about an IP address of a DNS server after the settings have been changed in accordance with an exemplary embodiment of the present invention.

DETAILED DESCRIPTION OF THE EXEMPLARY EMBODIMENTS

Exemplary embodiments, features and aspects of the present invention will now herein be described in detail below with reference to the drawings. It is noted that the present invention is not limited only to the disclosed embodiments. Rather the disclosed embodiments are exemplary in nature that show examples for embodying the present invention.

First Exemplary Embodiment

Figure 1:
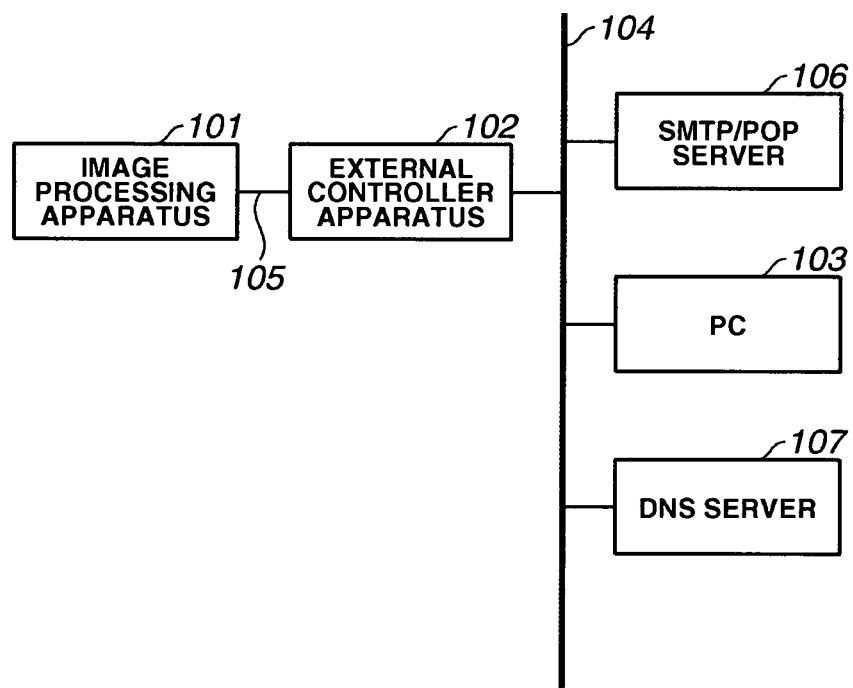
FIG. 1 is a block diagram showing an arrangement of an image processing system in accordance with an exemplary embodiment of the present invention.

FIG. 1 is a block diagram showing the arrangement of an image processing system in accordance with a first exemplary embodiment of the present invention. An image processing apparatus 101, functioning as a data processing apparatus, has various functions utilizing network communications in addition to fundamental functions including scanner function, copy function, and printer function. The image processing apparatus 101 is referred to as multi function peripheral (MFP). For example, as one of the functions using network communications, the image processing apparatus 101 has a "scan & send" function that enables a user to transmit a scanned image file to a server on the network.

An external controller apparatus 102 can control the image processing apparatus 101. The image processing apparatus 101 and the external controller apparatus 102 are connected with each other via a local network (private network) 105 that functions as a first network. Furthermore, the external controller apparatus 102 is connected to a public network 104 functioning as a second network. In this respect, the external controller apparatus 102 can function as a relay router between the local network 105 and the public network 104. Besides the external controller apparatus 102, the public network 104 is connected to a personal computer (PC) 103, a SMTP/POP server 106, and a DNS (Domain Name Service) server 107.

For example, the public network 104 and the local network 105 can be constructed from an Ethernet (registered trademark). The SMTP/POP server 106 can be an Email transmission/reception server. The SMTP/POP server 106 can perform Email transfer using SMTP (Simple Mail Transfer Protocol) as well as Email distribution using POP (Post Office Protocol) for its clients.

The DNS server 107 can perform conversion between domain name and IP address. The SMTP/POP server 106 stores, as a POP account, a registered account of the image processing apparatus 101. The DNS server 107 stores registered information relating to IP address and host name for all nodes connected to the public network 104.

Figure 2:
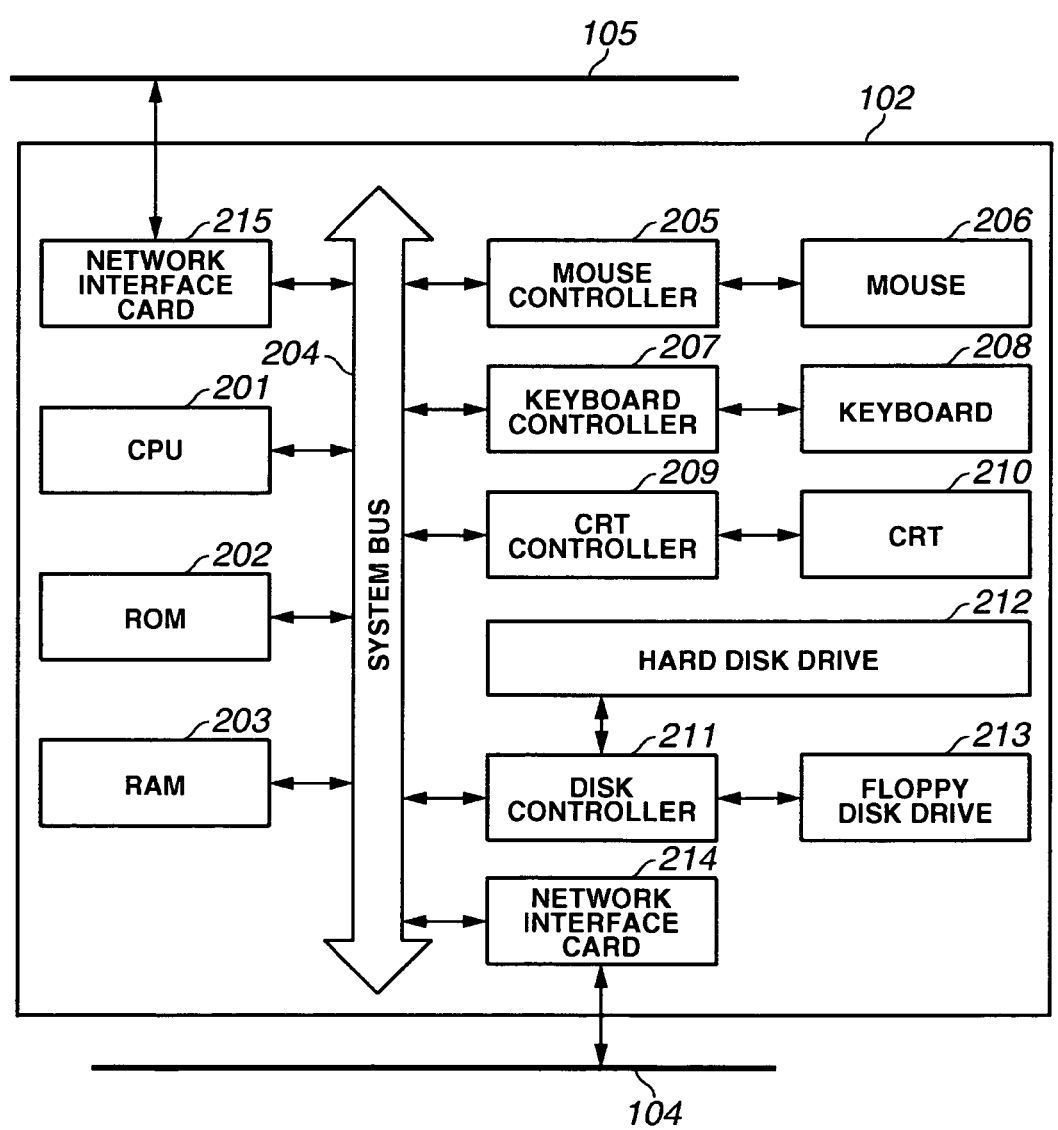
FIG. 2 is a block diagram showing a hardware arrangement of an external controller apparatus in accordance with an exemplary embodiment of the present invention.

FIG. 2 shows one example of a hardware arrangement for the external controller apparatus 102. The external controller apparatus 102 includes CPU 201, ROM 202, and RAM 203. CPU 201 performs an overall control of the external controller apparatus 102. ROM 202 stores various programs and related data required in the control of CPU 201. RAM 203 functions as a main memory of CPU 201 and provides a work area for CPU 201.

Furthermore, the external controller apparatus 102 includes a mouse 206 and a keyboard 208 which can respectively function as an input apparatus. A mouse controller 205 can control an instruction entered from the mouse 206. A keyboard controller 207 can control an instruction entered from the keyboard 208. A CRT display 210 is provided as a display apparatus. A CRT controller 209 controls the display of the CRT display 210. A hard disk drive 212 and a floppy disk drive 213 are respectively a recording medium that can store various programs and related data (e.g., a boot program, an operating system, and a variety of applications). A disk controller 211 controls the access to the hard disk drive 212 and the floppy disk drive 213.

A first network interface card 214 is an interface that controls bidirectional data communications between the external controller apparatus 102 and the FTP server 103 or PC 103 connected via the public network 104. A second network interface card 215 is an interface that controls bidirectional data communications between the external controller apparatus 102 and the image processing apparatus 101 connected via the local network 105. The above-described functional components are mutually connected via a system bus 204 and can communicate with each other.

Figure 3:
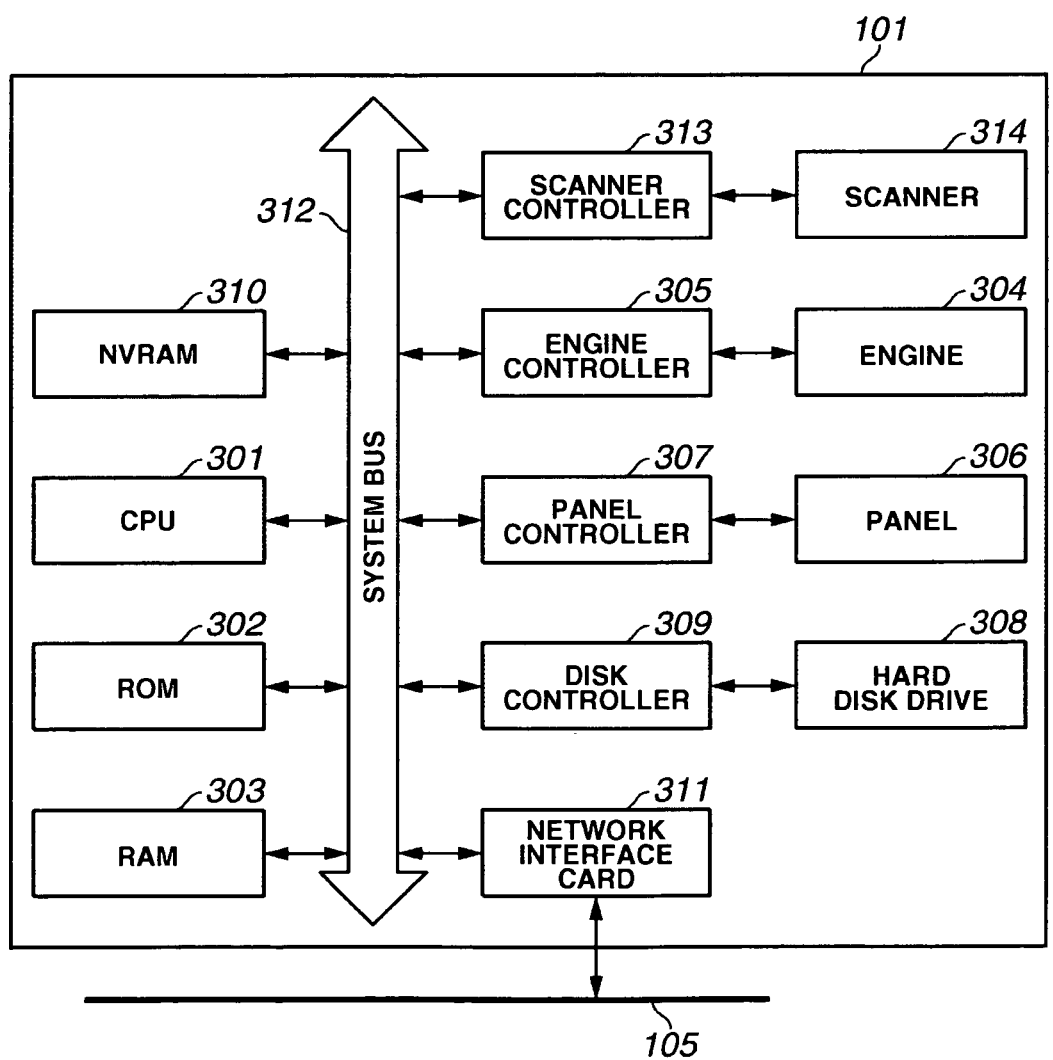
FIG. 3 is a block diagram showing a hardware arrangement of an image processing apparatus in accordance with an exemplary embodiment of the present invention.

FIG. 3 shows an example of a hardware arrangement for the image processing apparatus 101. The image processing apparatus 101 includes CPU 301, ROM 302, and RAM 303. CPU 301 performs an overall control of the processing apparatus 101. ROM 302 stores various programs and related data required in the control of CPU 301. RAM 303 functions as a main memory of CPU 301 and provides a work area for CPU 301. Furthermore, the image processing apparatus 101 includes an engine 304 which can realize various functions including printer and copy functions. An engine controller 305 controls the engine 304. A panel 306 can accept various instructions entered from a user and can display related information. A panel controller 307 can control input from or output to the panel 306. A hard disk drive 308 stores various programs and related data. A disk controller 309 controls the access to the hard disk drive 308. Also, a NVRAM 310 is provided which is a non volatile RAM.

A network interface card 311 is an interface that controls bidirectional data communications between the image processing apparatus 101 and the external controller apparatus 102 or the FTP server 103 connected via the local network 105. A scanner controller 313 controls a scanner 314. The above-described functional components of the processing apparatus 101 are mutually connected via a system bus 312 and can communicate with each other.

Figure 4:
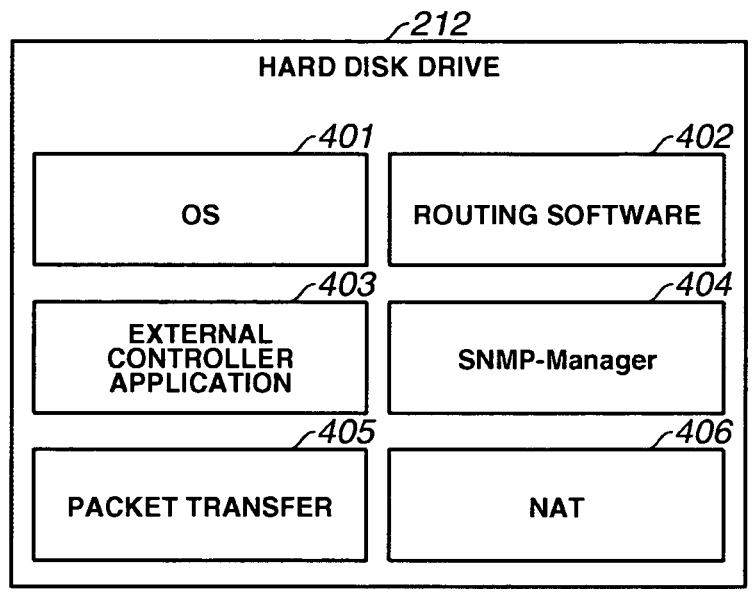
FIG. 4 is a diagram showing a software arrangement of an external controller apparatus in accordance with an exemplary embodiment of the present invention.

Next, a software arrangement of the external controller apparatus 102 and the image processing apparatus 101 will be described below. FIG. 4 shows system software and application programs stored in the hard disk drive 212 of the external controller apparatus 102. The hard disk drive 212, as shown in FIG. 4, can store operating system (OS) 401, routing software 402, external controller application 403, SNMP-Manager 404, packet transfer 405, and NAT (Network Address Translator) 406.

The routing software 402 can perform routing of transmitted/received data for the first and second network interface cards 214 and 215. The external controller application 403 can realize an extended function for the image processing apparatus 101.

The SNMP-Manager 404 can act as a manager of SNMP (Simple Network Management Protocol) to change the contents of MIB 504 stored in the image processing apparatus 101 or read out the same. The packet transfer 405 can rewrite the contents of a packet sent out of the image processing apparatus 101. The NAT (Network Address Translator) 406 can realize a NAT function between the local network 105 and the public network 104.

The external controller application 403 can cooperate with the image processing apparatus 101 to provide enhanced functions. For example, such functions include an enciphered communication function provided by the present exemplary embodiment. Accordingly, the image processing apparatus 101 of the present exemplary embodiment does not include an enciphered communication function.

In this case, the external controller apparatus application 403 can receive enciphered printing data from a printing client, decode or decipher them, and transmit the decoded data to the image processing apparatus 101. The enciphered communication function can maintain or increase the security level of the data flowing on the public network 104. In the present exemplary embodiment, the NAT 406 is constituted as a sub-set module of the routing software 402.

Figure 5:
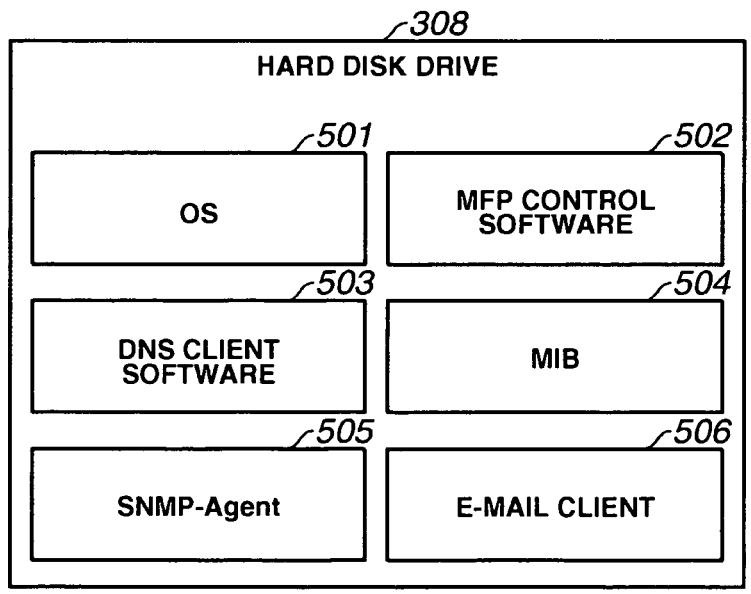
FIG. 5 is a diagram showing a software arrangement of an image processing apparatus in accordance with an exemplary embodiment of the present invention.

FIG. 5 shows system software and application programs stored in the hard disk drive 308 of the image processing apparatus 101. The hard disk drive 212, as shown in FIG. 5, can store operating system (OS) 501, MFP control software 502, DNS client 503, MIB (Management Information Base) 504, SNMP-Agent 505, and Email client 506.

The MFP control software 502 can control an overall operation of the multi function peripheral. The MIB 504 serves as a device information database. The DNS client software 503 has the capability of inquiring about an IP address corresponding to a domain name. More specifically, when the image processing apparatus 101 performs IP communications, the information indicating a communication destination may be a domain name. In this case, the DNS client software 503 sends an inquiry about an IP address corresponding to the domain name to a predetermined DNS server.

The SNMP-Agent 505 can realize an agent function of the SNMP protocol. The Email client 506 can install an Email client on the image processing apparatus 101 to perform transmission/reception of Email and related operations. The image processing apparatus 101 does not use a user interface (UI) to perform network settings for its own devices. The setting contents made by the external controller apparatus 102 can be copied as network settings for the image processing apparatus 101.

Next, details of exemplary packet routing of the external controller apparatus 102 will be described below. As described above, NAT 406 is installed on the external controller apparatus 102. When a network node having a local network IP address communicates with a node on the public network, NAT 406 can replace the local network IP address with a public network IP address. The processing of NAT 406 will be described below with reference to FIG. 6.

Figure 6:
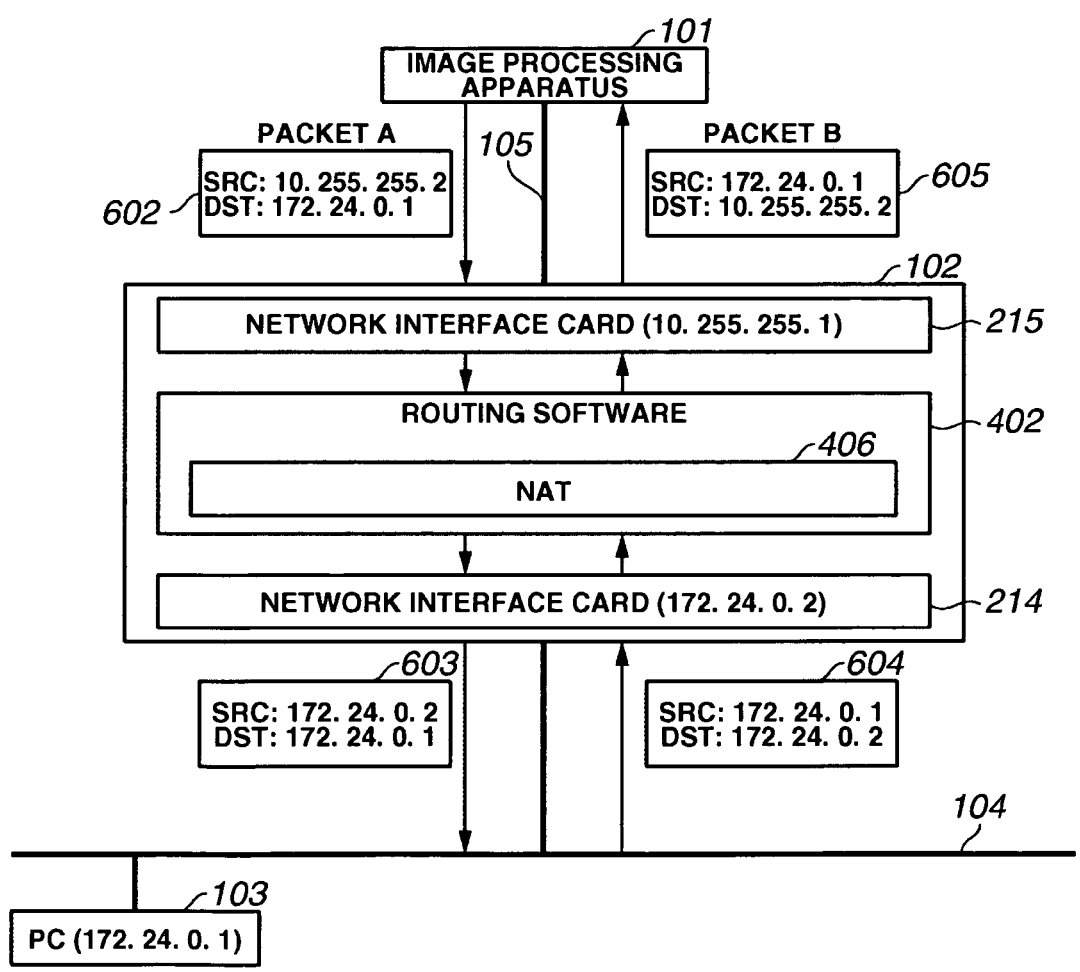
FIG. 6 is a diagram showing the NAT processing in accordance with an exemplary embodiment of the present invention.

FIG. 6 shows the change of IP address in a packet during IP communications performed between the image processing apparatus 101 and PC 103. In this example, exemplary IP addresses are allocated to respective nodes. The IP address of the image processing apparatus 101 is 10.255.255.2. The IP address of the external controller apparatus 102, on the local network 105, is 10.255.255.1. The IP address of the external controller apparatus 102, on the public network 104, is 172.24.0.2. The IP address of PC 103 is 172.24.0.1.

The local network 105 and the public network 104 have different network addresses. Thus, the external controller apparatus 102 must function as a router when the image processing apparatus 101 performs IP communications with PC 103. More specifically, a default gateway address being set in the image processing apparatus 101 is 10.255.255.2 that represents the IP address of the external controller apparatus 102.

It is now assumed that the image processing apparatus 101 performs TCP/IP communications with PC 103 under the above-described conditions. In this case, the image processing apparatus 101 sends a packet 602 including a source IP address 10.255.255.2 to PC 103. The packet 602 also includes a destination IP address 172.24.0.1. The packet 602 arrives at the external controller apparatus 102 functioning as a router.

The network interface card 215 receives the packet 602. NAT 406, which is a sub-set module of the routing software 402, rewrites the IP address. Namely, when NAT 406 receives the packet 602, NAT 406 substitutes a public network IP address of the external controller apparatus 102 (as a source IP address) for the IP address of the image processing apparatus 101. Then, NAT 406 performs communications with the destination IP address.

The external controller apparatus 102 sends out a packet 603 to the public network 104. The packet 603 includes a source IP address 172.24.0.2 (i.e., public network IP address of the external controller apparatus 102). The packet 603 also includes destination IP address 172.24.0.1 (i.e., IP address of PC 103). Namely, the NAT function of the external controller apparatus 102 can give a rewritten source IP address for a packet transmitted from the image processing apparatus 101 to the public network 104, as if the packet is originally sent out of the external controller apparatus 102. PC 103 receives the packet 603 and returns a reply in response to the packet.

PC 103 sends a reply packet 604 to be returned to the image processing apparatus 101. However, the source IP address contained in the packet 603 received by PC 103 is the address of the external controller apparatus 102. Therefore, PC 103 sends the reply packet 604 to the external controller apparatus 102. Namely, a destination IP address of the packet 604 is 172.24.0.2 that represents the public network IP address of the external controller apparatus 102. A source IP address of the packet 604 is 172.24.0.1 that represents the IP address of PC 103.

When the external controller apparatus 102 receives the packet 604, NAT 406 rewrites the destination IP address (i.e., replaces the address of the external controller apparatus 102 with the address of the image processing apparatus 101) and then sends a packet 605 to the local network 105. The packet 605 includes destination IP address 10.255.255.2 that represents the address of the image processing apparatus 101 and source IP address 172.24.0.1 that represents the address of PC 103. The image processing apparatus 101 receives the packet 605.

In this manner, the external controller apparatus 102 functioning as a router can rewrite IP addresses. Thus, the image processing apparatus 101 can communicate with any node on the public network 104 without notifying its local IP address.

In this case, there is no possibility of canceling the NAT processing depending on an address port value used in the TCP or UDP (User Datagram Protocol) communications between the image processing apparatus 101 and a node on the public network 104. Thus, NAT 406 performs the NAT processing and permits communications regardless of the listened port number for the node (i.e., communication destination of the image processing apparatus 101). On the other hand, when a node on the public network 104 communicates with the external controller apparatus 102 or the image processing apparatus 101, communications should be restricted from the viewpoint of security.

Figure 7:
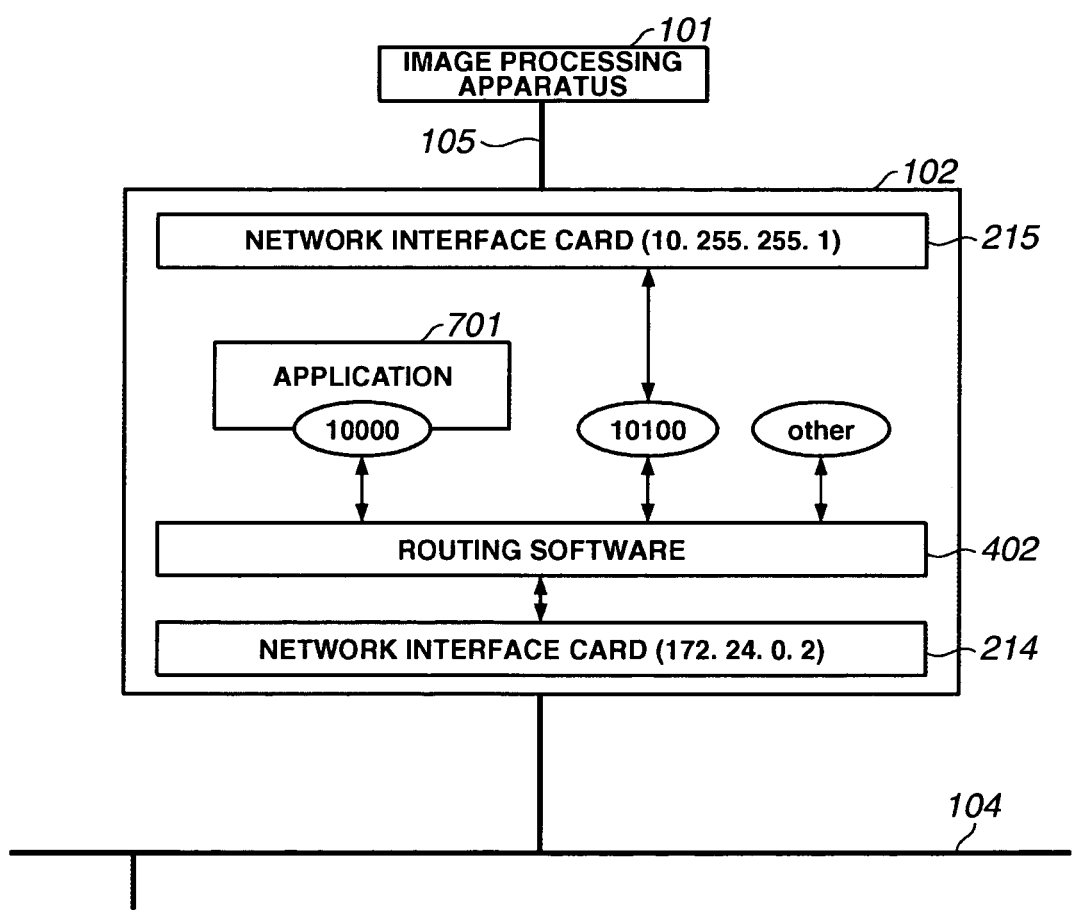
FIG. 7 is a diagram showing an operation of an external controller apparatus in the communication with a node on a public network in accordance with an exemplary embodiment of the present invention.

FIG. 7 is a diagram illustrating an exemplary operation of the external controller apparatus 102 in the TCP/IP or UDP/IP communications with a node on the public network 104. An application 701 is operating on the external controller apparatus 102 to perform TCP/IP communications with the node on the public network 104. The application 701 opens TCP port No. 10000, located adjacent to the first network interface 214, to constantly listen.

Furthermore, the routing software 402 has settings for transferring a packet from TCP port No. 10100, located at the first network interface 214, to the image processing apparatus 101. When an IP packet is received by the TCP port No. 10100, the routing software 402 rewrites the destination IP address of the received IP packet (i.e., designates the address 10.255.255.2 of the image processing apparatus 101 as destination). Then, the routing software 402 transmits the IP packet to the local network 105.

More specifically, when the first network interface 214 receives an IP packet directed to its own apparatus, the routing software 402 sends the received IP packet to the application 701 if the destination port is 10000. On the other hand, the routing software 402 transfers the received IP packet to the image processing apparatus 101 if the destination port is 10100. Otherwise, the routing software 402 abandons the IP packet.

In short, when a node of the public network 104 performs IP communications with the image processing apparatus 101, address port numbers used for the IP communications must be registered beforehand in the routing software 402.

Figure 8:
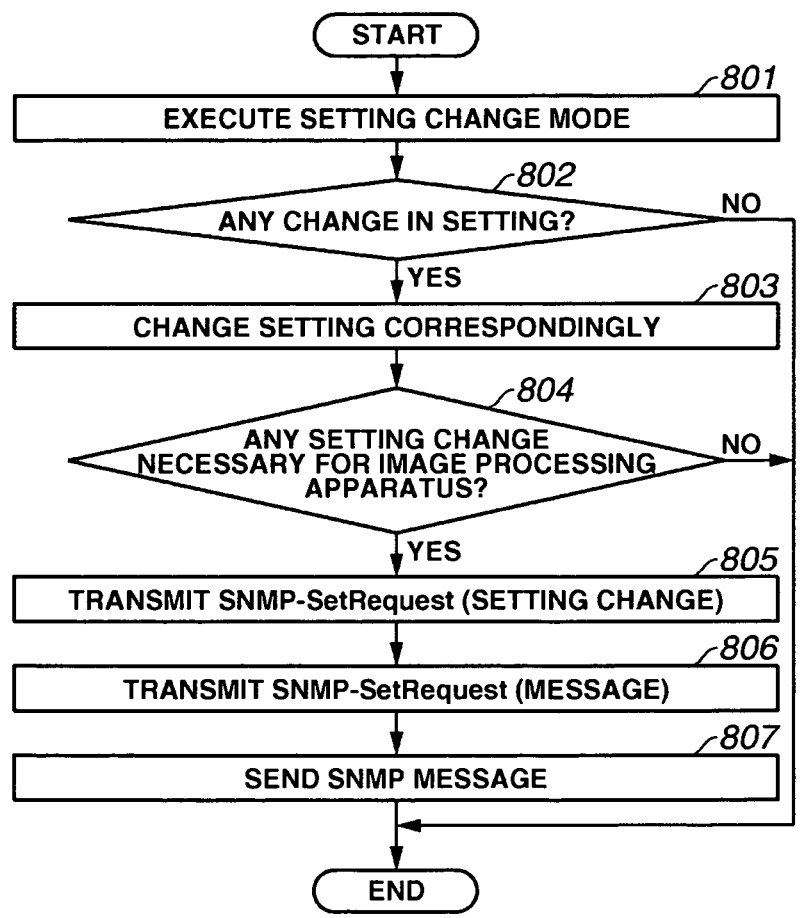
FIG. 8 is a flowchart showing a setting change operation performed in the external controller apparatus in accordance with an exemplary embodiment of the present invention.

FIG. 8 is a flowchart showing exemplary setting change processing performed in the external controller apparatus 102 in accordance with the present exemplary embodiment. In the following description the processing shown by the flowchart will be described as operations done by the software (also applied to other flowcharts). However, any processing shown in the flowchart can be executed in practice by CPU 201 once the software shown in FIG. 4 is loaded to RAM 203.

First, in STEP 801, the external controller 102 moves into a setting change mode in response to setting change instruction entered by a user through the external controller apparatus 102. In instructing the setting change mode, a user can use the mouse 206 and /or the keyboard 208 to operate UI displayed on the CRT 210 of the external controller apparatus 102. When the setting change mode is selected by a user, the external controller application 403 displays a setting change menu on the CRT 210.

For example, ON/OFF settings for various functions of the external controller apparatus 102 and network settings for the external controller apparatus 102 are changeable. For example, the network settings include TCP/IP settings, DNS settings, and LPD (Line Printer Daemon) settings. A user can select a necessary setting change on a setting change menu, or can cancel it. In this example, it is presumed that the external controller 102 can exit the setting change mode after a user has changed an IP address of the DNS server 107 and saved the changed information.

Next, in STEP 802, the external controller application 403 determines whether or not the settings for the external controller apparatus 102 have been changed by a user's operation. When the settings are not changed (i.e., NO in STEP 802), the external controller apparatus 102 and the image processing apparatus 101 can continue their operations based on the present settings. Therefore, the processing routine terminates without performing any special processing. On the other hand, when any setting is changed (i.e., YES in STEP 802), the processing routine proceeds to STEP 803 to change the settings according to changed contents.

STEP 803 executes the processing for validating the information whose settings have been changed by a user. In this example, the IP address information for the DNS server 107 is changed at the timing of STEP 801. Accordingly, the external controller application 403 accesses OS 401 to take out a configuration file describing IP address of the DNS server, and rewrites (i.e., replaces) an old IP address in the file with a new IP address. Then, the external controller application 403 reactivates a TCP/IP module which is one of configuration files of OS 401. With the above processing, the external controller apparatus 102 can operate based on a new IP address of the DNS server.

Next, in STEP 804, the external controller application 403 determines whether or not the setting changed contents in STEP 801 are accompanied by setting change for the image processing apparatus 101. Part of the network setting information, such as DNS, WINS, or mail server information, can be commonly used by the external controller apparatus 102 and the image processing apparatus 101. When these settings are changed, the image processing apparatus 101 must copy the information.

In this example, the IP address of the DNS server is the setting changed information in STEP 801. Thus, the external controller application 403 determines that the image processing apparatus 101 must copy the setting information. Thus, the processing routine proceeds to STEP 805. On the other hand, when the image processing apparatus 101 needs not copy the setting information (i.e., NO in STEP 804), the processing routine terminates.

In STEP 805, the external controller apparatus 102 changes the DNS settings for the image processing apparatus 101 according to SNMP protocol. More specifically, the external controller application 403 notifies the SNMP-Manager 404 of an item and its value to be set in the image processing apparatus 101 using a software inter-process communication method. In this example, the item is the IP address of the DNS server and the value is 172.24.0.80 that represents a new IP address of the DNS server 107.

The SNMP-Manager 404 converts the setting information notified from the external controller application 403 into a parameter for the SNMP protocol. The SNMP-Manager 404 calls an OID (Object ID) corresponding to the item (i.e., IP address of the DNS server) and converts the value into a syntax corresponding to the item (Object). Then, the SNP-Manager 404 transmits a SetRequest (i.e., operation of SNMP protocol) to the image processing apparatus 101. In this case, the OID and the value are the above-described ones.

The image processing apparatus 101 changes the DNS information in response to an SNMP-SetRequest transmitted from the external controller apparatus 102 in STEP 805. To start operations based on the changed setting contents, the image processing apparatus 101 must reboot the system. Hence, in STEP 806, the external controller application 403 sends a message, requesting the image processing apparatus 101 to encourage a user to reboot the system, to the SNMP-Manager 404.

The operation for encouraging a user to reboot the system is, for example, displaying a warning, such as "DNS setting has been changed, please reboot", on the panel 306 of the image processing apparatus 101, so that a user can know the necessity of rebooting the system of the image processing apparatus 101 in response to the DNS setting change. The SNMP-Manager 404 produces an SNMP message (as a message requesting the image processing apparatus 101 to encourage a user to reboot the system) and sends the SNMP message to the image processing apparatus 101.

Subsequently, in STEP 807, the external controller apparatus 102 activates the packet transfer 405 with a DNS option. The packet transfer 405 is a software module having the capability of rewriting the contents of an IP packet transmitted from the image processing apparatus 101 and transmitting the rewritten IP packet to a node on the public network 104. The packet transfer 405 can be controlled by the external controller application 403. The starting and ending processing for the packet transfer 405 can be also controlled by the external controller application 403.

In this example, a target protocol on which the packet transfer 405 can execute overwrite processing is DNS because the DNS information is changed in STEP 801. Accordingly, when the packet transfer 405 is activated, the external controller application 403 designates, as options, that the target protocol for the overwrite processing is DNS and that a changed portion of the DNS protocol is the IP address of the DNS server. After the packet transfer 405 is activated, the packet transfer 405 starts monitoring a DNS packet sent out of the image processing apparatus 101 according to an option designated by the external controller application 403.

The packet transfer 405 keeps listening to a UDP port No. 53 of the second network interface card 215 in a promiscuous mode. When the image processing apparatus 101 sends a packet to an old address of the DNS server according to the DNS protocol, the packet transfer 405 overwrites a portion of the packet including the old address with a new address and sends the packet to the public network 104.

Figure 9:
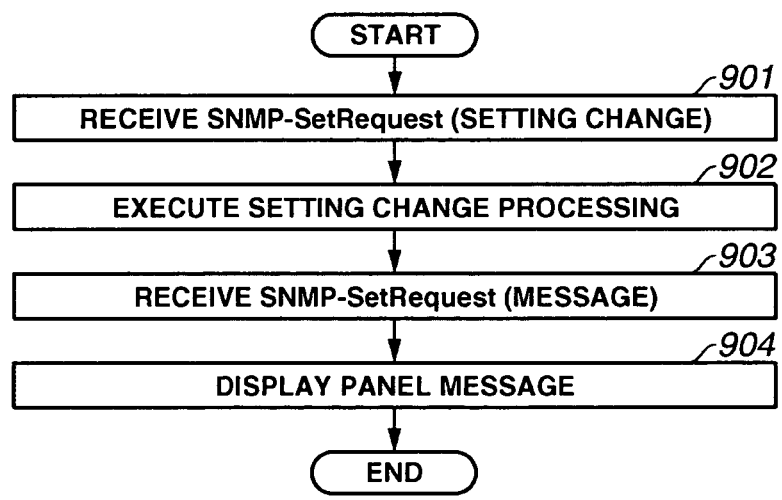
FIG. 9 is a flowchart showing an operation of the image processing apparatus corresponding to an operation of the external controller apparatus shown in FIG. 8.

Next, an exemplary operation of the image processing apparatus 101 corresponding to the operation of the external controller apparatus 102 shown in FIG. 8 will be described below with reference to the flowchart shown in FIG. 9.

As described above, in STEP 805 of FIG. 8, the external controller apparatus 102 sends the SNMP-SetRequest that contains an instruction of changing the DNS server address in the image processing apparatus 101. The image processing apparatus 101, in STEP 901, receives the SNMP-SetRequest. The SNMP-Agent 505 analyzes the received data. The SNMP-Agent 505 performs predetermined processing according to a requested SNMP operation of received data as well as the OID and the value. The SNMP-Agent 505 writes the value to the MIB 504 since the requested SNMP operation is SetRequest.

Next, in STEP 902, the SNMP-Agent 505 executes an instruction involved in the SNMP-SetRequest received in STEP 901. The instruction received in STEP 901 includes changing the IP address of the DNS server for the image processing apparatus 101. Thus, the SNMP-Agent 505 rewrites the IP address information of the DNS server that exists as a configuration file of the OS 501. When the IP address information of the DNS server is changed from the old address to a new address, the image processing apparatus 101 is required to reboot the system to start operations based on the new address.

Next, in STEP 903, the image processing apparatus 101 receives the SNMP-SetRequest transmitted from the external controller apparatus 102 in STEP 806. The received SNMP-SetRequest includes displaying the message on the panel 306 of the image processing apparatus 101 to encourage a user to reboot the system of the image processing apparatus 101. The SNMP-Agent 505 writes the value to MIB 504. The SNMP-Agent 505 performs software-to-software communications to transmit predetermined information to the MFP control software 502. In STEP 904, the MFP control software 502 receives the information and displays a message, such as "DNS setting has been changed, please reboot", on the panel 306.

Figure 10:
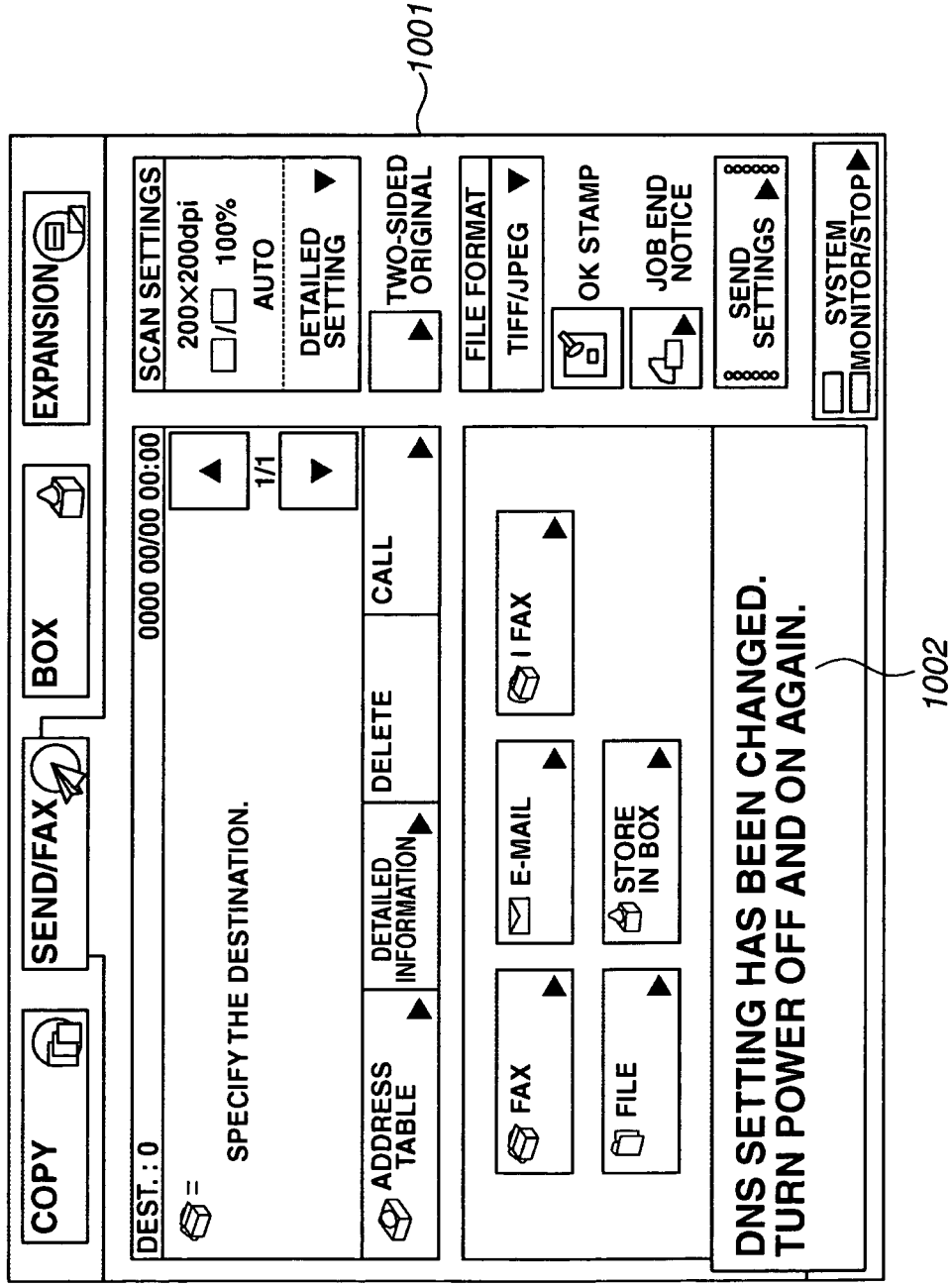
FIG. 10 is a view showing an example of message instructing re-activation of a power source of the image processing apparatus in accordance with an exemplary embodiment of the present invention.

FIG. 10 shows an example of user interface (UI) 1001 including the above-described message displayed on the panel 306. UI 1001 includes a status message area 1002 at the lower end of the screen. The status message area 1002 can display a message for a user, such as the message for the display performed in STEP 904. Sequential operations of STEP 901 to STEP 904 are the setting change processing of the image processing apparatus 101.

After accomplishing the setting change processing, the image processing apparatus 101 performs the following operations. It is now supposed that image data obtained by the scanner 314 are attached as file data to an electronic mail and then transmitted (referred to as "scan & send processing"). A user can manipulate the panel 306 to input an image scanning instruction and a destination electronic mail address. The MFP control software 502 analyzes the entered instruction. The MFP control software 502 activates the Email client 506 to transmit an electronic mail accompanying an image file.

The electronic mail is sent, based on SMTP, to the SMTP/POP server 106. In this case, in the IP communications with SMTP/POP server 106, OS 501 sends the DNS server 107 an inquiry about an IP address corresponding to the DNS name of the SMTP/POP server 106 held in OS 501. Then, OS 501 can start SMTP communications to send the data to the IP address returned from the DNS server 107.

The inquiry, sent from the image processing apparatus 101 to the DNS server 107, can be differentiated depending on whether or not the image processing apparatus 101 has rebooted the system after the processing of STEP 904. When the image processing apparatus 101 has not yet rebooted the system after finishing the processing of STEP 904, the IP address of the DNS server is the old address.

Accordingly, the image processing apparatus 101 transmits a DNS inquiry packet to the old IP address of the DNS server. On the other hand, when the image processing apparatus 101 has already rebooted the system after finishing the processing of STEP 904, OS 501 transmits the DNS inquiry packet to the new IP address of the DNS server received in the STEP 901.

Figure 11:
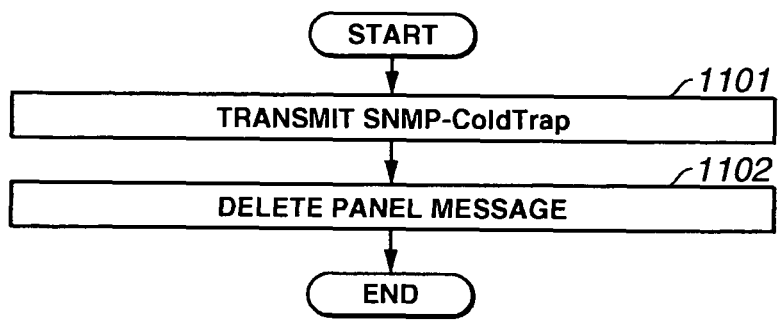
FIG. 11 is a flowchart showing an operation of the image processing apparatus having rebooted the system in accordance with an exemplary embodiment of the present invention.

FIG. 11 is a flowchart showing an exemplary operation of the image processing apparatus 101 having rebooted the system. After the above-described processing of STEP 904 is finished, OS 501 activates the SNMP-Agent 505 during a boosting process of the image processing apparatus 101. The activated SNMP-Agent 505 transmits an SNMP-ColdTrap message.

The SNMP-ColdTrap message is an SNMP operation that the SNMP-Agent 505 spontaneously transmits to notify the SNMP-Manager 404 of activation of the SNMP-Agent 505. In the present exemplary embodiment, the SNMP-Agent 505 transmits the SNMP-ColdTrap message to the external controller apparatus 102 (refer to STEP 1101). Next, in STEP 1102, the MFP control software 502 deletes the above-described message (i.e., the message displayed in the processing of STEP 904) from the panel 306.

Figure 12:
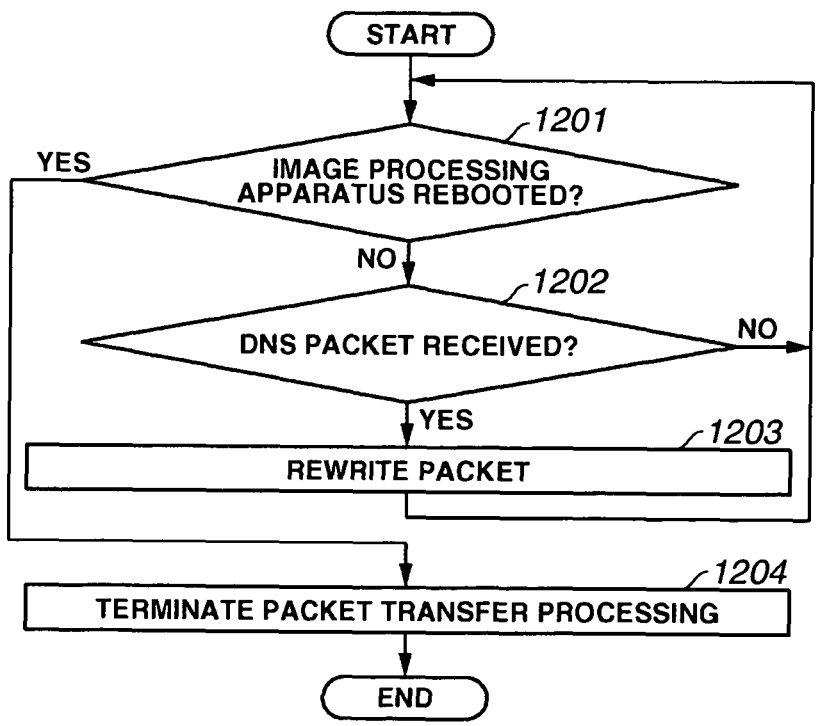
FIG. 12 is a flowchart showing an operation of the external controller apparatus after the settings have been changed in accordance with an exemplary embodiment of the present invention.

Next, an exemplary operation of the external controller apparatus 102 succeeding to the setting change processing will be described with reference to FIG. 12. It is now supposed that image data obtained by the scanner 314 are attached as file data to an electronic mail and then transmitted (referred to as "scan & send processing").

Regarding the processing performed in this case, if the image processing apparatus 101 has not rebooted the system after accomplishing the processing of STEP 806 shown in FIG. 8, the packet transfer 405 performs packet rewrite processing when the NAT processing is performed. On the other hand, if the image processing apparatus 101 has already rebooted the system, the packet transfer 405 of the external controller apparatus 102 needs not to rewrite any information because the image processing apparatus 101 can already operate based on the new IP address of the DNS server.

More specifically, first of all, the SNMP-Manager 404 keeps listening to an SNMP-ColdTrap port located adjacent to the second network interface card 215 and waits for an SNMP-ColdTrap message sent from the image processing apparatus 101. In this condition, in STEP 1201, the external controller apparatus 102 determines whether or not the image processing apparatus 101 has rebooted the system based on reception of the SNMP-ColdTrap message sent from the image processing apparatus 101.

It is now supposed that the image processing apparatus 101 has not yet rebooted the system and, to perform IP communications with the SMTP/POP server 106, OS 501 has sent the DNS server 107 an inquiry about an IP address corresponding to the DNS name of the SMTP/POP server 106. An old IP address can be used as the IP address of the DNS server 107 in the DNS inquiry packet.

Hence, the DNS inquiry packet is subjected to the NAT processing performed by the external controller apparatus 102. To this end, the packet transfer 405 keeps listening to a port and overwrites predetermined information of the IP packet before transferring it. The packet transfer 405 continuously performs the packet listen processing, and determines whether or not any DNS packet is received (refer to STEP 1202).

When no DNS inquiry packet is received (i.e., NO in Step S1202), the processing routine returns to STEP 1201 and repeats the above-described processing. In this case, the above-described predetermined information is the old IP address of the DNS server involved in the packet. When any DNS packet is received (i.e., YES in STEP 1202), the packet transfer 405 rewrites the destination IP address from the old IP address to a new IP address of the DNS server (refer to STEP 1203).

On the other hand, when the image processing apparatus 101 has already rebooted the system (i.e., YES in STEP 1201), the packet transfer 405 needs not to perform the rewrite processing because OS 501 of the image processing apparatus 102 is already using the new IP address as IP address of the DNS server 107. Hence, in this case, the packet transfer 405 terminates the operation (refer to STEP 1204).

Second Exemplary Embodiment

Next, a second exemplary embodiment of the present invention will be described. The second exemplary embodiment is different from the above-described first exemplary embodiment in the following points. In the second exemplary embodiment, the image processing apparatus 101 responds to an inquiry about the address of the DNS server sent from a node on the public network 104, while the external controller apparatus 102 rewrites the address of the DNS server contained in an response packet.

FIG. 13 is a flowchart showing an exemplary processing procedure performed by the external controller apparatus 102 that has received an inquiry about the IP address of the DNS server 107 from PC 103 after the settings have changed.

The second exemplary embodiment is described based on the following conditions and/or assumptions:

(1) PC 103 on the public network 104 acts as a client and the image processing apparatus 101 acts as a server in a client-and-server model;

(2) PC 103 can transmit any request message to the image processing apparatus 101 according to its own protocol. The image processing apparatus 101 can return a value in response to the request message. Furthermore, a command for inquiring an IP address of the DNS server used by the image processing apparatus 101 is prepared beforehand;

(3) The protocol of PC 103 is operable on UDP protocol, and a UDP port number is 10100;

(4) With predetermined settings, the external controller apparatus 102 can transfer a packet received from PC 103, that is directed to the UDP port No. 10100, to the image processing apparatus 102;

(5) The routing software 402 can transfer a UDP packet received by the UDP port No. 10100 of the first network interface card 214 to a UDP port No. 10100 of the image processing apparatus 101;

(6) The processing is in a state that the above-described sequential STEP 801 to STEP 807 shown in FIG. 8 has been already accomplished.

When PC 103 sends, based on its own protocol, an inquiry about an IP address of the DNS server used by the image processing apparatus 101, PC 103 can operate in the following manner. First, in STEP 1301, PC 103 sends, based on its own protocol, an inquiry to the image processing apparatus 101 to check an IP address of the DNS server used by the image processing apparatus 101. PC 103 produces a packet including an UDP message that contains a command inquiring the IP address of the DNS server defined as its own protocol. In this case, a destination IP address is the IP address of the external controller apparatus 102. The destination port number is 10100 that is used for its own protocol. PC 103 transmits, based on its own protocol, a packet to the public network 104.

In STEP 1302, the external controller apparatus 102 receives the packet transmitted from PC 103 in STEP 1301. Then, the external controller apparatus 102 transfers the received packet to the image processing apparatus 101. OS 401 and the routing software 402 of the external controller apparatus 102 confirm that the protocol and the destination port number of the received packet are respectively UDP protocol and 10100, and then transfer the received packet to the UDP port No. 10100 of the image processing apparatus 101.

In STEP 1303, the image processing apparatus 101 receives a packet based on its own protocol, and performs predetermined processing to return a reply. The MFP control software 502 decodes the packet received by the network interface card 311 of the image processing apparatus 101. The decoded results reveal that the protocol of the received packet is its own protocol and that PC 103 (i.e., client) inquires an IP address of the DNS server used by the image processing apparatus 101.

The MFP control software 502 sends OS 501 an inquiry about IP address information of the DNS server used by its own apparatus. OS 501 returns the old address as IP address information of the DNS server. This occurs because as described above, in STEP 805 of FIG. 8, the external controller apparatus 102 has notified the image processing apparatus 101 of the new IP address of the DNS server, using the SNMP-SetRequest operation.

Further then, in STEP 901 and STEP 903, the image processing apparatus 101 has received the SNMP-SetRequest and changed the settings for its own apparatus. However, the old IP address of the DNS server is still valid because the image processing apparatus 101 has not rebooted the system. Therefore, OS 501 returns the old IP address to the MFP control software 502.

The MFP control software 502 stores, in a data portion of its own protocol, the old IP address obtained from OS 501 as an IP address of the DNS server used by its own apparatus. Then, the MFP control software 502 produces a packet based the stored address and returns the packet to PC 103. The second network interface 215 of the external controller apparatus 102 receives a return packet transmitted from the image processing apparatus 101 based on its own protocol.

The external controller apparatus 102 determines whether or not the image processing apparatus 101 has rebooted the system (refer to STEP 1304). When the image processing apparatus 101 has already rebooted the system (i.e., YES in STEP 1304), the processing flow proceeds to STEP 1307. On the other hand, when the image processing apparatus 101 has not yet rebooted the system (i.e., NO in STEP 1304), the processing flow proceeds to STEP 1305.

In STEP 1305, the packet transfer 405 confirms a destination port number and a source port number of the received packet as well as a value of the UDP payload portion, and determines whether or not any rewrite processing is necessary. In this case, the source port number of the received packet is 10100 that is a port number of its own protocol. The own protocol is a protocol capable of inquiring the IP address of the DNS server. And, the data contained in the payload portion is the IP address of the DNS server. Therefore, the packet transfer 405 judges that the rewrite processing for the data is necessary. Thus, the processing flow proceeds to STEP 1306.

When the UDP port number is other than 10100 or 53 (for the DNS protocol), the packet transfer 405 judges that no rewriting of the packet is necessary and the processing flow proceeds to STEP 1307. Furthermore, when the IP address of the DNS server is not involved in the packet, the packet transfer 405 judges that no rewriting of the packet is necessary and the processing flow proceeds to STEP 1307.

In STEP 1306, the packet transfer 405 rewrites the data in the packet. More specifically, the packet transfer 405 substitutes a new IP address for the old IP address of the DNS server that is involved in the TCP payload portion of the packet. Then, the packet transfer 405 performs the processing for sending the packet to the routing software 402.

In STEP 1307, the routing software 402 transfers the received packet to PC 103. In this case, the routing software 402 rewrites the source IP address of the received packet. More specifically, the routing software 402 replaces the address of the image processing apparatus 101 with an IP address corresponding to the first network interface card 214 of the external controller apparatus 102, before the routing software 402 transmits the packet to PC 103.

In STEP 1308, PC 103 receives the packet transmitted from the external controller apparatus 102 in STEP 1307. The received packet contains the IP address of the DNS server used by the image processing apparatus 101 as a return value. The returned address value is the new IP address rewritten by the packet transfer 405, not the old IP address transmitted by the image processing apparatus 101.

According to the above-described first and second exemplary embodiments, the external controller 102 can rewrite necessary portions of a packet, even when the image processing apparatus 101 has not yet rebooted the system and accordingly the image processing apparatus 101 continues communications without validating the new settings. In other words, the first and second exemplary embodiments enable network communications based on new settings before the image processing apparatus 101 validates the new settings.

Namely, according to the present invention, the network communications can be realized based on new settings even if a data processing apparatus is not yet operating based on new settings done by a control apparatus.

Furthermore, the information relating to the setting change can be displayed for a user. The message encouraging a user to reboot the system of the image processing apparatus 101 can be also displayed. When such a message is displayed, the user can reboot the system. Thus, the new settings for the image processing apparatus 101 can be validated.

Furthermore, the external controller apparatus 102 performs a work for rewriting a part of packet only when the image processing apparatus 101 has not yet rebooted the system after the settings have been changed. Hence, in ordinary conditions, no substantial reduction in transfer rate can be recognized when the external controller apparatus 102 performs the data rewrite processing.

Other Exemplary Embodiments, Features and Aspects of the Present Invention

According to the present invention, the software program(s) realizing the above-described functions of the present exemplary embodiments can be supplied to the system or the apparatus. The system or the apparatus can read and execute the supplied program codes to realize the functions of the present exemplary embodiments. In this case, the equivalents of programs can be used if they possess comparable functions. Accordingly, when the functions or processes of the present invention are realized by a computer, program codes installed in the computer and a recording medium storing the programs are also means for realizing the present invention.

In other words, the present invention encompasses the computer programs that can realize the functions or processes of the present invention or any recording medium that can store the program(s). In this case, the type of program(s) can be selected from any one of object codes, interpreter programs, and OS script data. A recording medium supplying the program(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

The method for supplying the program(s) includes accessing a home page on the Internet using the browsing function of a client computer, when the home page allows each user to download the computer programs of the present invention, or compressed files of the programs having automatic installing functions, to a hard disk or other recording medium of the user.

Furthermore, the program codes constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, based on an instruction of the program, the operating system running on the computer may execute part or all of the processing so that the functions of the above-described exemplary embodiments can be realized.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-080593 filed Mar. 18, 2005, which is hereby incorporated by reference herein in its entirety.

What is claimed is:

1. A control apparatus provided external to a data processing apparatus, wherein the control apparatus is configured to control the data processing apparatus through a first network and is connected to a second network that is different from the first network, the control apparatus comprising:
   a changing unit configured to change setting information of a destination that is set on the control apparatus;
   a notifying unit configured to notify the data processing apparatus of the setting information changed by the changing unit;
   a determining unit configured to determine whether the data processing apparatus is operating based on the setting information notified by the notifying unit;
   a receiving unit configured to receive data from the data processing apparatus, wherein the data includes a first address to a destination on the second network;
   a transferring unit configured to transfer, in response to the receiving unit receiving the data from the data processing apparatus, the received data to the second network;
   a control unit configured to overwrite the first address of the destination included in the data received from the data processing apparatus with a second address according to the setting information changed by the changing unit, and to cause the transferring unit to transfer data to the destination on the second network,
   wherein after the changing unit changes setting information of a destination that is set on the control apparatus and after the control apparatus receives a reply from the data processing apparatus to an inquiry, wherein the inquiry was received from a client on the second network to be transmitted to the data processing apparatus and the inquiry was to check the address of the destination, the determining unit determines whether the data processing apparatus is operating based on the setting information notified by the notifying unit,
   wherein, in response to the data from the data processing apparatus being received by the receiving unit under a condition in which the determining unit determined that the data processing apparatus is not yet operating based on the setting information notified by the notifying unit, the control unit overwrites the first address of the destination included in the data received from the data processing apparatus with the second address according to the setting information changed by the changing unit and causes the transferring unit to transfer the overwritten data to the destination on the second network, and
   wherein, in response to the data from the data processing apparatus being received by the receiving unit under a condition in which the determining unit determined that the data processing apparatus is already operating based on the setting information notified by the notifying unit, the control unit causes the transferring unit to transfer the data received from the data processing apparatus to the destination on the second network without overwriting the first address of the destination with a second address according to the setting information changed by the changing unit; and
   a processing unit configured to execute at least one of the changing unit, the notifying unit, the determination unit, and the control unit in memory.

2. The control apparatus according to claim 1, further comprising a judging unit configured to judge a necessity of notification by the notifying unit in accordance with the setting information changed by the changing unit.

3. The control apparatus according to claim 1, wherein the first address is designated information included in data corresponding to a designated protocol and the control unit overwrites the designated information included in data corresponding to a designated protocol.

4. The control apparatus according to claim 1, wherein the determining unit further is configured to determine whether to notify the data processing apparatus of the setting information changed by the changing unit and, in response to the determining unit determining that the setting information is not accompanied by setting change for the data processing apparatus, the notifying unit refrains from notifying the data processing apparatus of the setting information changed by the changing unit.

5. The control apparatus according to claim 1, wherein the control unit overwrites the first address of the destination included in the data received from the data processing apparatus with the second address according to the setting information changed by the changing unit when a source address of the data processing apparatus is changed to a global address of the control apparatus.

6. The control apparatus according to claim 1, further comprising:
   a second network interface card; and
   a port located adjacent to the second network interface card, wherein the port is configured to receive a message from the data processing apparatus indicating that the data processing apparatus is operating based on the setting information notified by the notifying unit.

7. A control apparatus provided external to a data processing apparatus, wherein the control apparatus is configured to control the data processing apparatus through a first network and is connected to a second network that is different from the first network, the control apparatus comprising:
- a changing unit configured to change setting information of a destination that is set on the control apparatus;
- a notifying unit configured to notify the data processing apparatus of the setting information changed by the changing unit;
- a determining unit configured to determine whether the data processing apparatus performed a reboot operation after the notifying unit notified the data processing apparatus of the setting information changed by the changing unit;
- a receiving unit configured to receive data from the data processing apparatus, wherein the data includes a first address to a destination on the second network;
- a transferring unit configured to transfer, in response to the receiving unit receiving the data from the data processing apparatus, the received data to the second network;
- a control unit configured to overwrite the first address of the destination included in the data received from the data processing apparatus with a second address according to the setting information changed by the changing unit, and to cause the transferring unit to transfer data to the destination on the second network,
- wherein after the changing unit changes setting information of a destination that is set on the control apparatus and after the control apparatus receives a reply from the data processing apparatus to an inquiry, wherein the inquiry was received from a client on the second network to be transmitted to the data processing apparatus and the inquiry was to check the address of the destination, the determining unit determines whether the data processing us is operating based on the setting information notified by the notifying unit,
- wherein, in response to the data from the data processing apparatus being received by the receiving unit under a condition in which the determining unit determined that the data processing apparatus performed a reboot operation after the notifying unit notified the data processing apparatus of the setting information changed by the changing unit, the control unit overwrites the first address of the destination included in the data received from the data processing apparatus with the second address according to the setting information changed by the changing unit and causes the transferring unit to transfer the overwritten data to the destination on the second network, and
- wherein, in response to the data from the data processing apparatus being received by the receiving unit under a condition in which the determining unit determined that the data processing apparatus did not perform a reboot operation after the notifying unit notified the data processing apparatus of the setting information changed by the changing unit, the control unit causes the transferring unit to transfer the data received from the data processing apparatus to the destination on the second network without overwriting the first address of the destination with a second address according to the setting information changed by the changing unit; and
- a processing unit configured to execute at least one of the changing unit, the notifying unit, the determination unit, and the control unit in memory.

8. The control apparatus according to claim 7, further comprising a transmitting unit configured to transmit, to the data processing apparatus after the notifying unit notifies the data processing apparatus of the setting information changed by the changing unit, a message requesting the data processing apparatus to encourage a user to reboot the data processing apparatus.

9. A method for a control apparatus provided external to a data processing apparatus, wherein the control apparatus is configured to control the data processing apparatus through a first network and is connected to a second network that is different from the first network, the method comprising:
- changing setting information of a destination that is set on the control apparatus;
- notifying the data processing apparatus of the changed setting information;
- determining whether the data processing apparatus is operating based on the notified setting information;
- receiving data from the data processing apparatus, wherein the data includes a first address to a destination on the second network;
- transferring, in response to receiving the data from the data processing apparatus, the received data to the second network; and
- controlling to transfer data to the destination on the second network,
- wherein after changing changes setting information of a destination that is set on the control apparatus and after the control apparatus receives a reply from the data processing apparatusto an inquiry, wherein the inquiry was received from a client on the second network to be transmitted to the data processing apparatus and the inquiry was to check the address of the destination, determining includes determining whether the data processing apparatus is operating based on the notified setting information,
- wherein, in response to the data from the data processing apparatus being received under a condition in which it is determined that the data processing apparatus is not yet operating based on the notified setting information, controlling includes overwriting the first address of the destination included in the data received from the data processing apparatus with the second address according to the changed setting information and causing transfer of the overwritten data to the destination on the second network, and
- wherein, in response to the data from the data processing apparatus being received under a condition in which it is determined that the data processing apparatus is already operating based on the notified setting information, controlling includes causing transfer of the data received from the data processing apparatus to the destination on the second network without overwriting the first address of the destination with a second address according to the changed setting information.

10. A non-transitory computer readable storage medium storing a program that causes a control apparatus to perform the method according to claim 9.

11. A method for a control apparatus provided external to a data processing apparatus, wherein the control apparatus is configured to control the data processing apparatus through a first network and is connected to a second network that is different from the first network, the method comprising:
- changing setting information of a destination that is set on the control apparatus;
- notifying the data processing apparatus of the changed setting information;

determining whether the data processing apparatus performed a reboot operation after notifying the data processing apparatus of the changed setting information;

receiving data from the data processing apparatus, wherein the data includes a first address to a destination on the second network;

transferring, in response to receiving the data from the data processing apparatus, the received data to the second network; and controlling to transfer data to the destination on the second network, wherein after changing changes setting information of a destination that is set on the control apparatus and after the control apparatus receives a reply from the data processing apparatus to an inquiry, wherein the inquiry was received from a client on the second network to be transmitted to the data processing apparatus and the inquiry was to check the address of the destination, determining includes determining whether the data processing apparatus is operating based on the notified setting information, wherein, in response to the data from the data processing apparatus being received under a condition in which it is determined that the data processing apparatus performed a reboot operation after notifying the data processing apparatus of the changed setting information, controlling includes overwriting the first address of the destination included in the data received from the data processing apparatus with the second address according to the changed setting information and causing transfer of the overwritten data to the destination on the second network, and wherein, in response to the data from the data processing apparatus being received under a condition in which it is determined that the data processing apparatus did not perform a reboot operation after notifying the data processing apparatus of the changed setting information, controlling includes causing transfer of the data received from the data processing apparatus to the destination on the second network without overwriting the first address of the destination with a second address according to the changed setting information.

12. A non-transitory computer readable storage medium storing a program that causes a control apparatus to perform the method according to claim 11.

13. A data processing system and network comprising:

a data processing apparatus connected to a first network; and a control apparatus provided external to the data processing apparatus, wherein the control apparatus is configured to control the data processing apparatus through a first network and is connected to a second network that is different from the first network, wherein the control apparatus comprises, a changing unit configured to change setting information of a destination that is set on the control apparatus, a notifying unit configured to notify the data processing apparatus of the setting information changed by the changing unit, a determining unit configured to determine whether the data processing apparatus performed a reboot operation after the notifying unit notified the data processing apparatus of the setting information changed by the changing unit, a receiving unit configured to receive data from the data processing apparatus, wherein the data includes a first address to a destination on the second network, a transferring unit configured to transfer, in response to the receiving unit receiving the data from the data processing apparatus, the received data to the second network, a control unit configured to overwrite the first address of the destination included in the data received from the data processing apparatus with a second address according to the setting information changed by the changing unit, and to cause the transferring unit to transfer data to the destination on the second network, wherein after the changing unit changes setting information of a destination that is set on the control apparatus and after the control apparatus receives a reply from the data processing apparatus to an inquiry, wherein the inquiry was received from a client on the second network to be transmitted to the data processing apparatus and the inquiry was to check the address of the destination, the determining unit determines whether the data processing us is operating based on the setting information notified by the notifying unit, wherein, in response to the data from the data processing apparatus being received by the receiving unit under a condition in which the determining unit determined that the data processing apparatus performed a reboot operation after the notifying unit notified the data processing apparatus of the setting information changed by the changing unit, the control unit overwrites the first address of the destination included in the data received from the data processing apparatus with the second address according to the setting information changed by the changing unit and causes the transferring unit to transfer the overwritten data to the destination on the second network, and wherein, in response to the data from the data processing apparatus being received by the receiving unit under a condition in which the determining unit determined that the data processing apparatus did not perform a reboot operation after the notifying unit notified the data processing apparatus of the setting information changed by the changing unit, the control unit causes the transferring unit to transfer the data received from the data processing apparatus to the destination on the second network without overwriting the first address of the destination with a second address according to the setting information changed by the changing unit, and a processing unit configured to execute at least one of the changing unit, the notifying unit, the determination unit, and the control unit in memory.

* * * * *

UNITED STATES PATENT AND TRADEMARK OFFICE
CERTIFICATE OF CORRECTION

PATENT NO.        : 8,706,848 B2                                             Page 1 of 1
APPLICATION NO.   : 11/372633
DATED             : April 22, 2014
INVENTOR(S)       : Hiroki Shouno It is certified that error appears in the above-identified patent and that said Letters Patent is hereby corrected as shown below:

Title page, item [73] should read as follows:

CANON KABUSHIKI KAISHA
30-2, SHIMOMARUKO 3-CHOME, OHTA-KU
TOKYO, JAPAN 146-8501

Signed and Sealed this
Eighteenth Day of November, 2014

Michelle K. Lee
*Deputy Director of the United States Patent and Trademark Office*